United States Patent
Jiang et al.

(10) Patent No.: US 9,389,342 B2
(45) Date of Patent: Jul. 12, 2016

(54) VARIABLE FOCUS LENS SYSTEM

(71) Applicant: Wisconsin Alumni Research Foundation, Madison, WI (US)

(72) Inventors: Hongrui Jiang, Madison, WI (US); Chenhui Li, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 632 days.

(21) Appl. No.: 13/788,657

(22) Filed: Mar. 7, 2013

(65) Prior Publication Data
US 2014/0253870 A1 Sep. 11, 2014

(51) Int. Cl.
G02C 7/04 (2006.01)
G02B 3/14 (2006.01)
G02C 7/08 (2006.01)
G02B 26/00 (2006.01)

(52) U.S. Cl.
CPC ............... *G02B 3/14* (2013.01); *G02B 26/005* (2013.01); *G02C 7/04* (2013.01); *G02C 7/041* (2013.01); *G02C 7/085* (2013.01)

(58) Field of Classification Search
CPC .......... G02B 3/12; G02B 3/14; G02B 26/004; G02B 26/005
USPC ............. 351/159.02, 159.03, 159.04, 159.05, 351/159.06, 159.1, 159.39, 159.4; 359/226.3
See application file for complete search history.

(56) References Cited

U.S. PATENT DOCUMENTS

| 6,369,954 | B1 | 4/2002 | Berge et al. |
|---|---|---|---|
| 7,068,439 | B2 | 6/2006 | Esch et al. |
| 7,085,065 | B2 | 8/2006 | Silver |
| 7,106,519 | B2 | 9/2006 | Aizenberg et al. |
| 7,327,524 | B2 | 2/2008 | Renders et al. |
| 7,359,124 | B1 | 4/2008 | Fang et al. |
| 7,382,544 | B2 | 6/2008 | Cernasov |
| 7,452,075 | B2 | 11/2008 | Iuliano |
| 7,554,743 | B2 | 6/2009 | Jiang et al. |
| 7,697,187 | B2 | 4/2010 | Kato et al. |
| 2002/0024631 | A1* | 2/2002 | Roffman ........... G02C 7/04 351/159.1 |
| 2005/0143814 | A1 | 6/2005 | Esch et al. |
| 2007/0109438 | A1 | 5/2007 | Duparre et al. |

(Continued)

OTHER PUBLICATIONS

Ki-Hun Jeong, "Biologically Inspired Artificial Compound Eyes", Science, New Series, vol. 312, No. 5773 (Apr. 28, 2006), pp. 557-561.

(Continued)

*Primary Examiner* — Ricky Mack
*Assistant Examiner* — Robert E Tallman
(74) *Attorney, Agent, or Firm* — Boyle Fredrickson, S.C.

(57) ABSTRACT

A variable-focus lens system that includes a lens assembly having an electrowetting liquid lens that can be wrapped onto a curved surface such as a lens without distorting a chamber holding the electrowetting liquid lens is provided. The lens assembly includes a container body having a cup, in which the chamber is defined, and supports that extend in different directions from the cup. A flexible base substrate is arranged under the container body. Both the container body and flexible base substrate may be made from a soft polymer material and made using low-temperature fabrication processes. The flexible base substrate may be thinner than the container body and provide a relatively large surface area that engages the curved surface such that the stresses associated with wrapping a micro lens assembly onto the curved surface may be primarily absorbed by the flexible base substrate.

27 Claims, 4 Drawing Sheets

(56) References Cited

U.S. PATENT DOCUMENTS

| | | | |
|---|---|---|---|
| 2007/0177276 | A1 | 8/2007 | D'ardhuy et al. |
| 2007/0211207 | A1 | 9/2007 | Lo et al. |
| 2007/0263293 | A1 | 11/2007 | Batchko et al. |
| 2007/0279758 | A1 | 12/2007 | Jiang et al. |
| 2008/0259463 | A1 | 10/2008 | Shephard |
| 2010/0079724 | A1* | 4/2010 | Pugh ............... B29D 11/00009 351/159.75 |
| 2012/0057244 | A1* | 3/2012 | Pugh ....................... G02B 3/14 359/665 |
| 2013/0229618 | A1* | 9/2013 | Otts ........................ G02B 3/14 351/159.68 |
| 2014/0002789 | A1 | 1/2014 | Pugh et al. |

OTHER PUBLICATIONS

Hayes et al., "Video-Speed Electronic paper based on electrowetting", Nature, vol. 425, Sep. 25, 2003, pp. 383-385.

"Going with the flow", Science Technology Quarterly, Jun. 10, 2004, Economist.com, pp. 1-4.

Holden et al., "Global Vision Impairment Due to Uncorrected Presbyopia", Arch Ophthalmol, vol. 126, No. 12, Dec. 2008, pp. 1731-1739.

Schachar, "The Correction of Presbyopia", Int Ophthalmol Clin 2001; 41:53-70.

Ortner et al., "Causes and Correction of Presbyopia: A Review", Acta clin Craot 2002; 41 (Suppl 4), 39-43.

P. Kaufman "Scleral Expansion Surgery of Presbyopia", Ophthalmology, vol. 108, No. 12, Dec. 2001, pp. 2161-2162.

Wallace, III "Multifocal vision after cataract surgery", Current Opinion in Ophthalmology 1998, 9; 1:66-70.

Glasser, "Restoration of accommodation", Curr Opin Ophthalmol 17:12-18, 2006.

Tonekaboni et al., "The IOL horizon: accommodative intraocular lenses", Optometry, vol. 76, No. 3, Mar. 2005, pp. 185-190.

Dick, "Accommodative intraocular lenses: current status", Curr Opin Ophthalmol 16:8-26, 2005.

Li at al., "Switchable electro-optic diffractive lens with high efficiency for ophthalmic applications", PNAS, vol. 103, No. 16, Apr. 18, 2006, pp. 6100-6104.

Zeng et al., "Tunable liquid microlens actuated by infrared light-responsive hydrogel", Applied Physis Letters 93, 151101 (2008).

Forrest, "The path to ubiquitous and low-cost organic electronic appliances on plastic", Nature, vol. 428, Apr. 29, 2004, pp. 911-918.

Bourne, "Worldwide glaucoma through the looking glass", Br J Ophthalmol 2006: 90(3):253-254.

Kaufmann, C. et al., "Comparison of Dynamic Contour Tonometry with Goldmann Applanation Tonometry", Investigative Ophthalmology & Visual Science, Sep. 2004, vol. 45, No. 9, pp. 3118-3121.

H.C. Ko et al., "A hemispherical electronic eye camera based on compressible silicon optoelectronics", Nature, vol. 454, Aug. 2008, pp. 748-752.

Ren et al., "Tunable-focus liquid microlens array using dielectrophoretic effect", Optics Express, vol. 16, No. 4, Feb. 18, 2008, pp. 2646-2652.

C.C. Cheng et al., "Variable focus dielectric liquid droplet lens", Optical Express, vol. 14, No. 9, May 1, 2006, pp. 4101-4106.

Kim at al., "Viewing-angle-enhanced integral imaging system using a curved lens array", Optics Express, vol. 12, No. 3, Feb. 9, 2004, pp. 421-429.

IJzerman et al., "7.4: Design of 2D/3D Switchable Displays", SID Tech. Digest 34, 98 (2005).

Jung et al., "Dynamically tunable hemispherical electronic eye camera system with adjustable zoom capability", PNAS, vol. 108, No. 5, Feb. 1, 2011, pp. 1788-1793.

T.K. Shih et al., "Fabrication of PDMS (polydimethylsiloxane) microlens and diffuser using replica molding", Microelectronic Engineering 83 (2006) 2499-2503.

Krupenkin et al., "Tunable liquid microlens", Applied Physics Letters 82, 316 (2003).

C.C. Cheng et al., "Dielectrically actuated liquid lens", Optics Express, vol. 15, No. 12, Jun. 11, 2007, pp. 7140-7145.

Vallet et al., "Electrowetting of water and aqueous solutions on poly(ethylene terephthalate) insulating films", Polymer vol. 37, No. 12, 1996, pp. 2465-2470.

Zeng et al., "Tunable microlens arrays actuated by various thermo-responsive hydrogel structures", J. Micromech. Microeng. 20 (2010) 115035 (11 pp).

Eddings et al., "Determining the optimal PDMS—PDMS bonding technique for microfluidic devices", J. Micromech. Micoreng. 18 (2008) 067001 (4pp).

Moon et al., "Low voltage electrowetting-on-dielectric", Journal of Applied Physics 92, 4080 (2002).

Kuiper et al., "Variable-focus liquid lens for miniature cameras", Applied Physics Letters 85, 1128 (2004).

L. Dong et al., "Adaptive liquid microlenses activated by stimuli-responsibe hydrogels", Nature, vol. 442, Aug. 3, 2005, pp. 551-554.

D. Zhu et al., "Focus-Tunable Microlens Arrays Fabricated on Spherical Surfaces", Journal of Microelectromechanical Systems, vol. 20, No. 2, Apr. 2011, pp. 389-395.

B. Lee et al., "Three-dimensional display by use of integral photography with dynamically variable image plane ", Optics Letters, vol. 26, No. 19, Oct. 1, 2011, pp. 1481-1482.

Ren et al., "Variable-focus liquid lens", Optics Express, vol. 16, No. 10, May 14, 2007, pp. 5931-5936.

Ren at al., "Tunable-focus microlens arrays using nanosized polymer-dispersed liquid crystal droplets", Optics Communications 247 (2005) 101-106.

B. Berge et al., "Variable focal lens controlled by an external voltage: An application of electrowetting", Eur. Phys. J. E 3, 159-163 (2000).

Parviz, "Augmented Reality in a Contact Lens: A new generation of contact lenses built with very small circuits and LEDs Promises bionic eyesight", http://www.spectrum/ieee.org/biomedical/bionics/augmented-reality-in-a-contact-lens, Sep. 1, 2009, 11 pages.

* cited by examiner

VARIABLE FOCUS LENS SYSTEM

REFERENCE TO GOVERNMENT GRANT

This invention was made with government support under OD008678 awarded by the National Institute of Health and 0745000 awarded by the National Science Foundation. The government has certain rights in the invention.

FIELD OF THE INVENTION

The invention relates generally to optic devices and, in particular, to variable-focus lenses such as microlenses that are driven by electrowetting.

BACKGROUND AND SUMMARY OF THE INVENTION

Microlenses are becoming increasingly important components in miniaturized optical systems. Known microlenses can be either tunable for variable-focus or made on curved surfaces, such as on spherical surfaces of artificial compound eyes, but not both. Some variable-focus microlenses are tunable based on phase modulation but are capable of only relatively small magnitudes of change in the focal lengths due to material properties. Other variable-focus microlenses are tunable based on pressure but require complex external mechanical control systems and are difficult to incorporate into lens arrays.

Liquid-based variable-focus microlenses have been used in photonics, display, and biomedical systems because they do not require complicated mechanical systems for tuning, but are limited to use on rigid flat surfaces. For example, electrowetting microlenses are typically fabricated on rigid flat substrates, such as glass, silicon and polyethylene terephthalate, making them incompatible with curved surfaces. Attempts have been made to provide liquid-based variable-focus microlenses that are tunable based on actuation by thermo-sensitive hydrogels on curved surfaces, but these have proven to be overly complicated and suffer long response time due to their temperature dependant actuation mechanisms.

Therefore, it is a primary object and feature of the present invention to provide a variable-focus lens system having an electrowetting liquid lens arranged in a lens assembly that is flexible and can be smoothly wrapped onto the curved surface.

It is a further object and feature of the present invention to provide a variable-focus lens system having an electrowetting liquid lens arranged on a curved surface and defining a relatively short tuning response time.

It is a still further object and feature of the present invention to provide a variable-focus lens system having an electrowetting liquid lens arranged in a lens assembly that is flexible and made using low-temperature fabrication processes.

In accordance with the present invention, a variable-focus lens system is provided that includes a lens assembly having an electrowetting liquid lens for providing a variable-focus characteristic to the variable-focus lens system. The electrowetting liquid lens includes a first liquid and a second liquid abutting and immiscible with respect to the first liquid so as to define a curved interface between the first and second liquids. The electrowetting lens may be a microlens such that the lens assembly defines a microlens assembly. The curved interface defines a radius of curvature responsive to an electrical stimulus to vary the radius of curvature for tuning a focal length of the electrowetting liquid lens so as to provide a variable-focus characteristic to the variable-focus lens system. The lens assembly includes a container body having a cup defining a chamber therein for housing the electrowetting liquid lens and a flexible base substrate arranged below and supporting the container body. The flexible base substrate is movable between a first position wherein the flexible base substrate defines a substantially planar profile shape and a second position wherein the flexible base substrate defines a substantially curved profile shape. This may allow the lens assembly to be manufactured as generally flat components while being sufficiently flexible to allow the lens assembly to be smoothly wrapped onto or incorporated into a curved surface, such as a hemispherical surface, for use. This may offer relatively improving the field of view characteristics and enhance creation of three-dimensional effects by way of the variable-focus lens system.

In accordance with another aspect of the invention, the optic device defines a curved surface and the lens assembly is arranged upon the curved surface of the optic device. The optic device may include at least a portion of a spherical surface and the lens assembly may be arranged upon the optic device such that the flexible base substrate conforms to at least a portion of the spherical surface of the optic device. The flexible base substrate may curve about multiple axes for conforming to the spherical surface of the optic device. This may allow the variable-focus lens system to include a lens assembly that is arranged upon a camera lens such as a cellular telephone camera lens or an endoscope lens. This may also allow the variable-focus lens system to include a lens assembly that is arranged upon a contact lens which may be usable for treating vision conditions such as presbyopia.

In accordance with another aspect of the invention, the container body of the lens assembly includes multiple supports extending over the flexible base substrate and outwardly from the cup in different directions. The cup of the container body may include a side wall defining a closed-perimeter shape, such as a generally circular outer perimeter shape, of the cup and the multiple supports may extend radially from the outer perimeter of the cup. The cup side wall may define an inner circumferential surface. An electrode layer, a dielectric layer, and a hydrophobic coating layer may be arranged between the electrowetting liquid lens and the inner circumferential surface of the cup side wall. An upper surface of the flexible base substrate may support the electrowetting liquid lens from below and the hydrophobic coating layer may transversely support the electrowetting liquid lens. This may allow for a lens assembly with a flexible base substrate that can smoothly conform to curved surfaces.

In accordance with another aspect of the invention, a first electrode may be defined at the electrode layer and a second electrode may be arranged upon the flexible base substrate for electrically communicating with the electrowetting liquid lens. The second electrode may be arranged concentrically inward of the first electrode layer at a central location within the chamber in which the electrowetting liquid lens is housed. This may allow for a lens assembly that has a compact construction that may provide short response times and low electrical power consumption and may be robust under voltage cycling.

In accordance with another aspect of the invention, the flexible base substrate may define an inner segment arranged below the cup of the container body and multiple flaps extending outwardly from the flexible base substrate inner segment. In this way, the multiple flaps may be respectively arranged below the multiple supports of the container body. This may provide spaces between adjacent flaps of the flexible base substrate that accommodate wrapping the flexible base substrate, which may have been manufactured as a flat component, over a curved surface without wrinkling and while presenting a relatively large surface area at an interface through which the lens assembly may engage an optic device.

In accordance with another aspect of the invention, the container body and the flexible base substrate may be made from a soft polymer material, such as a polydimethylsiloxane (PDMS) material. The flexible base substrate may be thinner than the container body so that the flexible base may be relatively more compliant or more readily deformable than the container body. This may allow for a lens assembly with a flexible base substrate that can smoothly conform to curved surfaces.

In accordance with another aspect of the invention, a method of making a variable-focus lens system includes forming a flexible base substrate from a soft polymer material.

A container body is formed that may have a cup defining a chamber therein. The container body may be arranged relative to the flexible base substrate such that the container body extends away from the flexible base substrate. An electrowetting liquid lens is provided in the chamber of the cup of the container body. The electrowetting liquid lens includes a first liquid and a second liquid abutting and immiscible with respect to the first liquid so as to define a curved interface between the first and second liquids. The curved interface defines a radius of curvature responsive to an electrical stimulus to vary the radius of curvature for tuning a focal length of the electrowetting liquid lens. This provides a variable-focus characteristic to the variable-focus lens system. The lens assembly may be arranged upon a curved surface of an optic device such that the flexible base substrate of the lens assembly bends to conform to a profile shape of the curved surface of the optic structure. This may allow for a lens assembly with a flexible base substrate that can smoothly conform to curved surfaces.

In accordance with another aspect of the invention, the container body is formed from a prepolymer mixture that is cured at a curing temperature. At least one of a conductive film layer, a dielectric layer, and a hydrophobic coating layer may be applied to the container body at an application temperature that is lower than the curing temperature. Each of the conductive film layer, dielectric layer, and hydrophobic coating layer may be applied to an inner circumferential surface of a side wall of the container body cup at the application temperature that is lower than the curing temperature. The curing temperature may be less than about 80 degrees C. and the coating temperature may be less than about 40 degrees C. This may allow a lens assembly to be made using low-temperature fabrication processes that can reduce stress(es) on components of the lens assembly during fabrication and may correspondingly avoid damage to such polymer-based components during fabrication.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
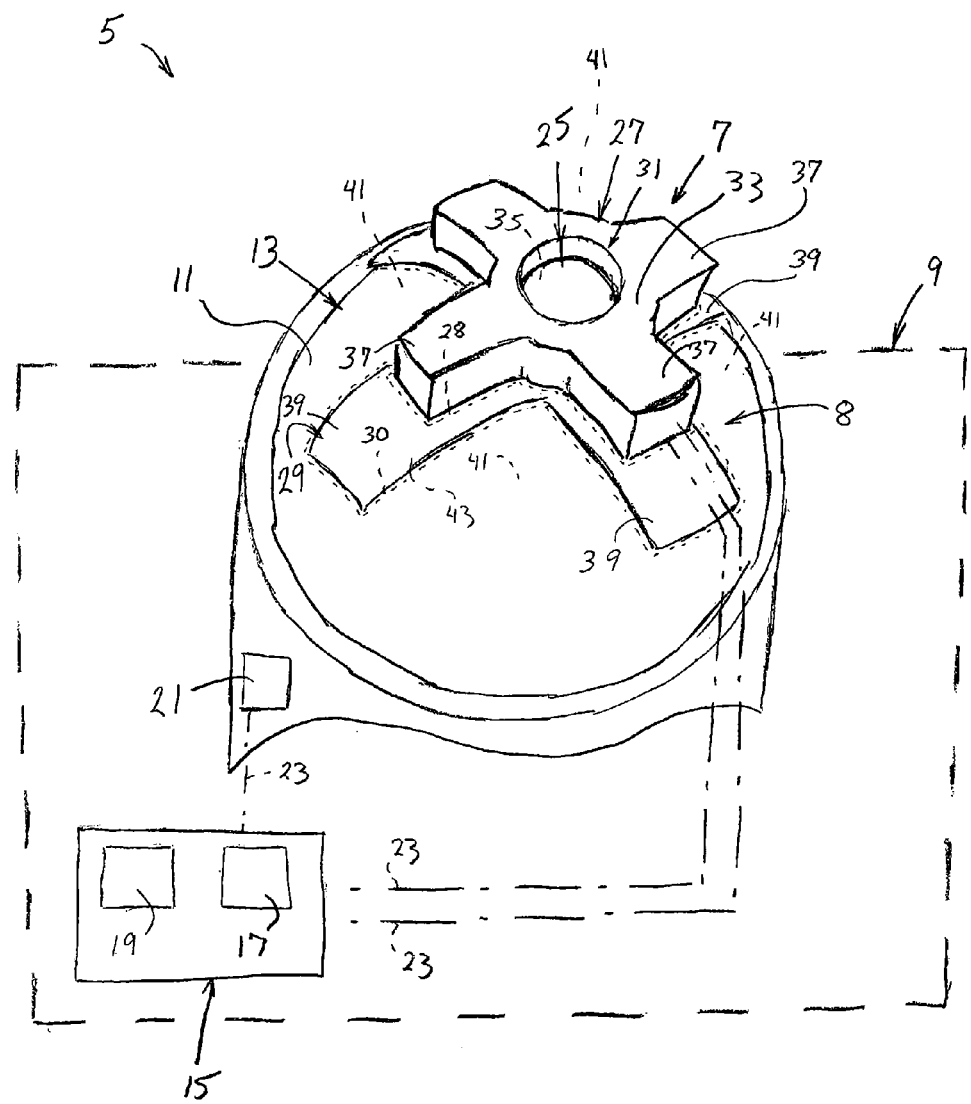
FIG. 1 is a pictorial view of a schematic representation of a camera system incorporating a variable-focus lens system in accordance with the present invention.

Referring to FIG. 1, a variable-focus lens system 5 is shown that includes a lens assembly 7 which provides electrowetting-based variable-focus characteristics to the variable-focus lens system 5. Lens assembly 7 is shown as defining a microlens assembly, although may be larger, that is arranged upon a curved mounting surface 8. In this embodiment, the curved mounting surface 8 is defined upon an optic device 9, although the curved mounting surface 8 may define other non-flat curvilinear surfaces. Optic device 9 is shown here as being a camera system, although optic device 9 may be some other device such as a contact lens, as described in greater detail elsewhere herein. This camera system embodiment of the optic device 9 shown in FIG. 1 may be incorporated into a variety of suitable camera systems. Such camera systems may include small cameras incorporated into medical devices such as endoscopes, consumer electronic devices such as cellular telephone cameras, laboratory devices such as cameras usable with microfluidic devices and lab-on-a-chip devices, and various military camera applications. The optic device 9 includes a curved surface 11 which may be defined as a hemispherical or other curvilinear surface of the lens 13 of the optic device 9 and to which the lens assembly 7 conforms. The optic device 9 includes a control system 15 for controlling the electrowetting-based variable-focus characteristics of the variable-focus lens system 5. The control system 15 includes a controller 17, a power supply 19, and various sensors 21 that are operably connected to respective ones of each other by way of conductors 23. The sensor(s) 21 may include infrared and/or other sensors detecting operating characteristics of the variable-focus lens system 5 to allow the controller 17 to control the lens assembly 7 for auto-focusing the variable-focus lens system 5. The controller 17 may establish and modulate a voltage across an electrowetting liquid lens 25 of the lens assembly 7 so as to control the electrowetting-based variable-focus characteristics of the variable-focus lens system 5, as described in greater detail elsewhere herein.

Still referring to FIG. 1, the lens assembly 7 includes a container body 27 and a flexible base substrate 29 arranged under the container body 27. The flexible base substrate 29 engages the curved surface 11 of the lens 13 of the optic device 9 so as to provide the interface between the optic device 9 and the lens assembly 7. The container body 27 has a cup 31 with a side wall 33 defining a chamber 35 that holds the electrowetting liquid lens 25. The side wall 33 defines a closed-perimeter shape. In this embodiment, the closed-perimeter shape of the side wall 33 exemplarily defines a generally circular outer perimeter of the cup 31, and multiple supports 37 extend in different directions from the cup 31 shown as extending radially from the outer perimeter of the cup 31. The supports 37 are aligned with and arranged over flaps 39 of the flexible base substrate 29, such that the flaps 39 also extend in different directions with respect to each other, like the supports 37. In this way, spaces 41 are defined between adjacent pairs of the flaps 39 and supports 37.

Still referring to FIG. 1, both the container body 27 and the flexible base substrate 29 may be made from a flexible material, for example, a soft polymer material, such as a PDMS material. This allows the lens assembly 7 to be easily flexible and conform to the shape of the curved surface 11 of the lens 13 of the optic device 9. In this embodiment, the flexible base substrate 29 is thinner than the container body 27. The lens assembly 7 defines an inner segment 28 corresponding to a projected footprint of the container body 27 relative to the optic device 9. The lens assembly 7 defines an outer segment 30 corresponding to a projected footprint of a portion of the flexible base substrate 29 that extends transversely beyond the container body 27 relative to the optic device 9. In an embodiment in which the container body 27 and flexible base substrate 29 are made from the same soft polymer material and in which the flexible base substrate 29 is thinner than the container body 27, the flexible base substrate 29 is relatively more flexible than the container body 27, whereby the outer segment 30 of the lens assembly 7 is relatively more flexible than the inner segment 28 of the lens assembly 7. This allows the relatively thinner and more flexible outer segment 30 to sustain more stress than the inner segment 28 when wrapping and conforming the lens assembly 7 to the curved surface 11 of the lens 13 of the optic device 9. In this way, substantially all of the bending-induced stresses associated with curving the lens assembly 7 about multiple axes to conform to the curved surface 11 of the lens 13 of the optic device 9 may be absorbed primarily by the flexible base substrate 29 and to a lesser extent the supports 37 of the container body 27. This allows bending-induced stresses realized toward a central segment of the cup 31 to be nominal, whereby deformation of the chamber 35 when wrapping and conforming the lens assembly 7 to the curved surface 11 of the lens 13 of the optic device 9 may also be nominal.

Figure 2:
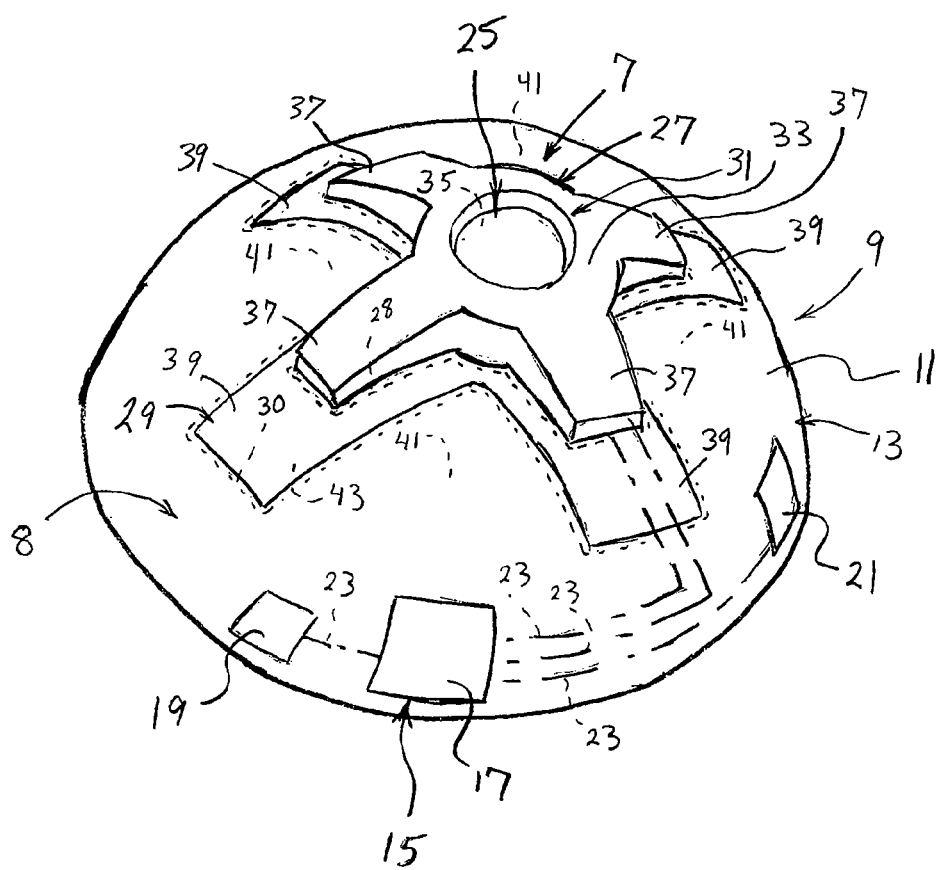
FIG. 2 is a pictorial view of a schematic representation of a contact lens incorporating a variable-focus lens system in accordance with the present invention.

Referring now to FIG. 2, variable-focus lens system 5 is mostly identical to that of FIG. 1, whereby such descriptions are applicable here with respect to the variable-focus lens system 5 of FIG. 2. The variable-focus lens system 5 of FIG. 2 differs from that of FIG. 1 in the following ways. In this embodiment shown in FIG. 2, the optic device 9 is a contact lens to be worn on an eye of a user, providing electrowetting-based variable-focus characteristics by way of the lens assembly 7. The power supply 19 may be an energy storage device such as a battery or may be an energy-harvesting device, such as a piezoelectric, inductive coil(s), or photovoltaic-based energy harvesting device. The lens assembly 7 need not be micro-sized, per se, but may instead be relatively larger, such as including an electrowetting liquid lens 25 having a diameter of between about 4 mm to 5 mm. Furthermore, the lens assembly 7 and cooperating components may be embedded into the contact lens optic device 9 such as by direct integration type embedment into material of the contact lens optic device 9 or by their arrangement between multiple film layers of the contact lens optic device 9.

Figure 3:
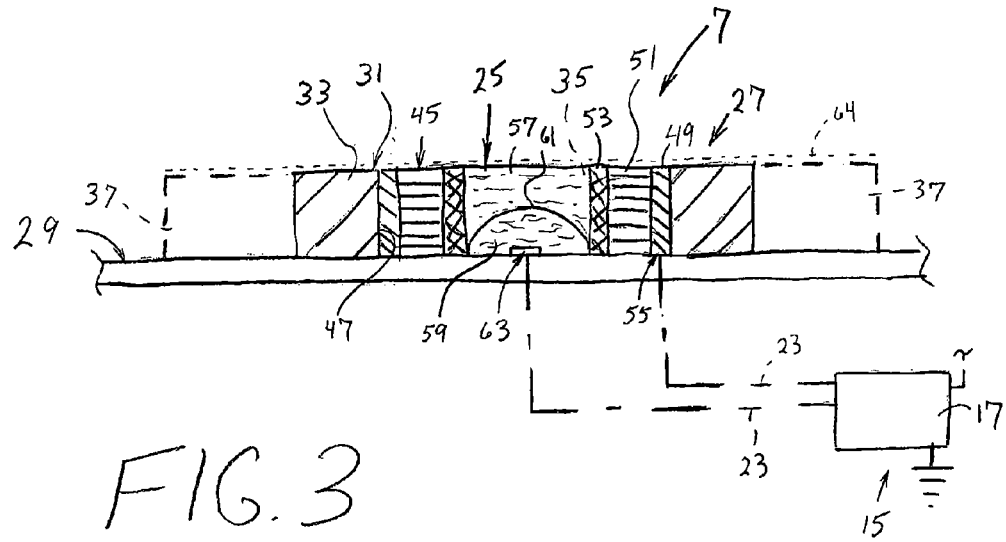
FIG. 3 is a cross-sectional view of a lens assembly of a variable-focus lens system in accordance with the present invention.

Referring now to FIG. 3, the cup 31 of the container body 27 includes a multilayer coating 45. The multilayer coating 45 is arranged inwardly of an inner circumferential surface 47 of the cup side wall 33. The multilayer coating 45 includes a conductive film layer 49, a dielectric layer 51, and a hydrophobic coating layer 53, and defines an outer boundary of the chamber 35 in which the electrowetting lens 25 is arranged. In this embodiment, the conductive film layer 49 directly abuts and is concentrically inward of the inner circumferential surface 47 of the cup side wall 33. The conductive film layer 49 is electrically conductive, whereby the conductive film layer 49 defines an electrode 55 operably connected to the controller 17 by a conductor 23. The conductive film layer 49 may be made from an indium tin oxide (ITO) material. The dielectric layer 51 directly abuts and is concentrically inward of the conductive film layer 49. The dielectric layer 51 may be made from a silicon oxide ($SiO_2$) material. The hydrophobic coating layer 53 directly abuts and is concentrically inward of the dielectric layer 51. The hydrophobic coating layer 53 may be made from a trichlorosilane material.

Still referring to FIG. 3, the electrowetting lens 25 abuts and is concentrically inward of the hydrophobic coating layer 53. The electrowetting liquid lens 25 includes a first liquid 57 and a second liquid 59 abutting and immiscible with respect to the first liquid 57 so as to define a curved interface 61 therebetween. Suitable immiscible liquids for use as the first and second liquids 57, 59 include water and silicone oil. The electrode 55, through the multilayer coating 45, is arranged in the electrical contact with the first liquid 57. An electrode 63 is arranged in electrical contact with the second liquid 59 and is operably connected to the controller 17 by a conductor 23. In this way, the first and second liquids 57, 59 are arranged within a circuit controlled by the controller 17 such that a radius of curvature defined by the interface 61 is variable and responsive to an electrical stimulus from the controller 17. This allows the controller 17 to vary the radius of curvature of the interface 61 for tuning the focal length of the electrowetting liquid lens 25 so as to provide the variable-focus characteristic to the variable-focus lens system 5. In one embodiment, a clear cover layer 64 that may also be made from a soft polymer material, such as a PDMS material, may be arranged over the container body 27 so as to cover the electrowetting liquid lens 25.

Figure 4:
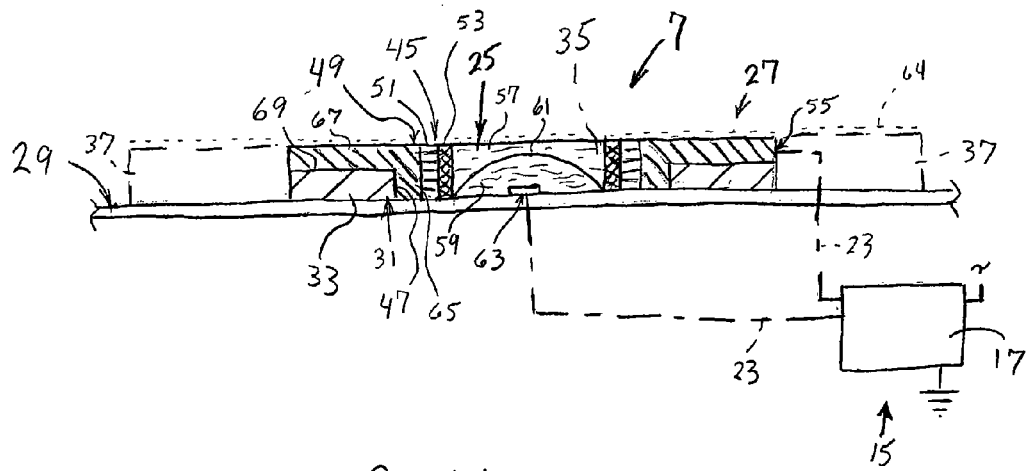
FIG. 4 is a cross-sectional view of a variant of the lens assembly of FIG. 3.

Referring now to FIG. 4, the lens assembly 7 is mostly identical to that of FIG. 3, whereby such descriptions are applicable here with respect to the lens assembly 7 of FIG. 4. The lens assembly 7 of FIG. 4 differs from that of FIG. 3 in the following ways. The lens assembly 7 shown in FIG. 4 has a multilayer coating 45 that coats the inside of the cup 31 and at least partially overlies the cup 31. The conductive film layer 49 of this embodiment defines a first segment 65 extending upwardly away from the flexible base substrate 29. A second segment 67 of the conductive film layer 49 extends perpendicular and outwardly away from the first segment 65. The first segment 65 directly abuts and is concentrically inward of the inner circumferential surface 47 of the cup side wall 33 and the second segment 67 directly abuts and overlies an upper surface 69 of the cup side wall 33.

Figure 5:
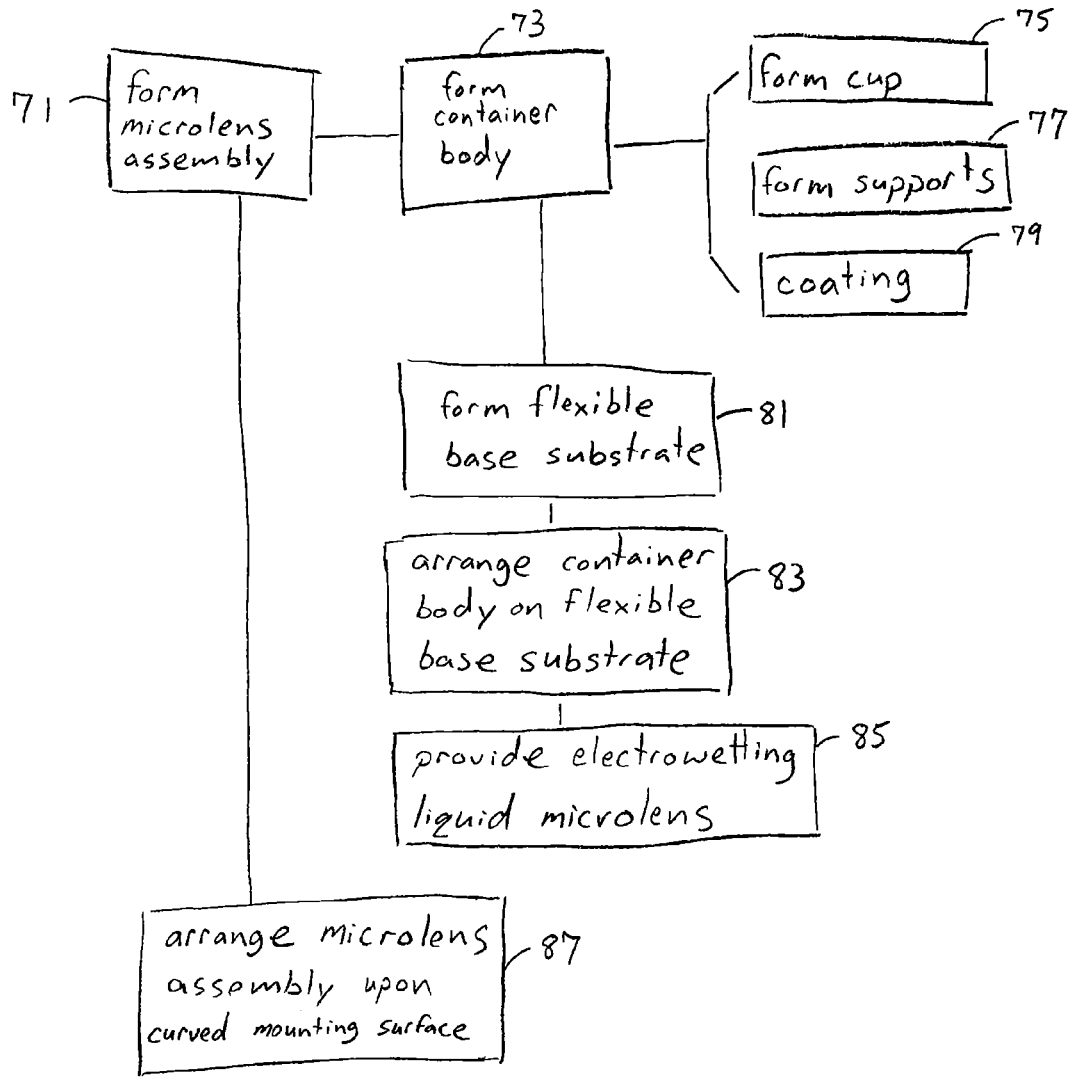
FIG. 5 is a flowchart of a fabrication process for making lens assembly of a variable-focus lens system in accordance with the present invention.

Referring now to FIG. 5 and with further reference to FIG. 1, an exemplary way of making a variable-focus lens system 5 is shown in FIG. 5. The lens assembly 7 is formed, including forming a container body 27, represented at blocks 71 and 73, respectively. Forming the container body 27 includes forming a cup 31 and supports 37, represented at blocks 75 and 77. The cup 31 and supports 37 may be integral with each other and prepared by making the container body 27 using a soft lithography technique. This may include making a prepolymer mold by using a mask corresponding to a perimeter shape(s) of the container body 27 upon a glass or other suitable lithography substrate and photopatterning a prepolymer material such as an isobornyl acrylate (IBA) material under ultraviolet exposure, which in one embodiment may be at an intensity of about 9 mW/cm$^2$ and for a time of about 20 seconds. The process of patterning IBA includes providing the prepolymer of IBA and UV exposure so that the prepolymer polymerizes to poly-IBA. The poly-IBA polymer mold may be covered by a PDMS prepolymer mixture and cured at a temperature less than about 80 degrees C., such as about 75 degrees C. The PDMS prepolymer mixture may be cured for about four hours. In one embodiment, this may provide a container body 27 with a thickness of about 700 µm and the cup 31 may have an inside diameter corresponding to the chamber 35 of about 5 mm, prior to coating. The particular dimensions of the container body 27 may be selected based on the intended end-use of the variable-focus lens system 5.

Referring now to FIG. 5, with further reference to FIG. 3, block 79 represents applying the multilayer coating 45 to the container body 27. The cup side wall 33 may be coated with the conductive film layer 49 which may include sputter-coating the inner circumferential surface 47 and/or upper surface 69 (FIG. 4) with ITO. This may be done to provide the conductive film layer 49 with an ITO thickness of about 50 nm or other suitable thickness and may be done at a temperature of less than about 40 degrees C., such as about 30 degrees C. so as to define the electrode 55. The dielectric layer 51 is applied against the conductive film layer 49. This may include sputter-coating silicon oxide ($SiO_2$) material against the conductive film layer 49 to achieve a thickness of about 120 nm or other suitable thickness of the dielectric layer 51. The hydrophobic coating layer 53 may be applied to the surface of the dielectric layer 51 by evaporating under vacuum pressure to provide a layer of, for example, trichlorosilane material over the $SiO_2$ or other material of the dielectric layer 51. This may provide a thickness of about 10 nm or other suitable thickness of the hydrophobic coating layer 53.

Still referring to FIG. 5 with further reference to FIG. 3, as represented at block 81, the flexible base substrate 29 is also made using a soft lithography technique. The soft lithography technique for making the flexible base substrate 29 can be mostly identical to that for making the container body 27, whereby the above description of the soft lithography technique for making the container body 27 is applicable here with respect to the flexible base substrate 29. The technique differs in that the mask used corresponds to a perimeter shape (s) of the flexible base substrate 29 and the flexible base substrate 29 is made substantially thinner container body 27, for example, less than about one-half of the thickness of the container body 27, or about 300 µm in one embodiment. As represented at block 83, the container body 27 is arranged upon the flexible base substrate 29. This can be done by way of a bonding procedure. In one embodiment, respective surfaces of each of the container body 27 and flexible base substrate 29 are treated with $O_2$ plasma and then bonded together using a nonthermal, surface treatment-type, bonding procedure. As represented at block 85, the electrowetting liquid lens 25 is provided into the container body 27. This may be done by filling the chamber 35 with the first and second liquids 57, 59 that are immiscible, such as water and silicone oil. The clear cover layer 64 may be arranged over the electrowetting liquid lens 25 by way of an $O_2$ plasma nonthermal, surface treatment-type, bonding procedure for bonding the clear cover layer 64 to the container body 27. As represented at block 87, the flat lens assembly 7 is arranged upon the curved mounting surface 8. This may be done by wrapping the lens assembly 7 onto the curved surface 11 of the lens 13 of the optic device 9 and adhesively or otherwise bonding the flexible base substrate 29 to the lens 13, or other curved mounting surface 8. The electrodes 55, 63 are connected by way of conductors 23 to the controller 17 of control system 15.

Various modes of carrying out the invention are contemplated as being within the scope of the following claims particularly pointing out and distinctly claiming the subject matter which is regarded as the invention.

We claim:

1. A method of making a variable-focus lens system, comprising:
    forming a lens assembly by,
        forming a container body having a generally cylindrical cup defining a chamber therein;
        forming a flexible base substrate from a soft polymer material;
        arranging the container body relative to the flexible base substrate such that the container body extends away from the flexible base substrate,
        providing an electrowetting liquid lens in the chamber of the cup of the container body, the electrowetting liquid lens including a first liquid and a second liquid abutting and immiscible with respect to the first liquid so as to define a curved interface between the first and second liquids, the curved interface defining a radius of curvature responsive to an electrical stimulus to vary the radius of curvature for tuning a focal length of the electrowetting liquid lens so as to provide a variable-focus characteristic to the variable-focus lens system;
    arranging the lens assembly upon a curved mounting surface such that the flexible base substrate of the lens assembly bends to conform to a profile shape of the curved mounting surface;
    arranging a first electrode in the container body at a location radically spaced from the cylindrical cup, the first electrode being in electrical contact with the first liquid;
    arranging a second electrode in electrical contact with the second liquid;
    selectively applying the electrical stimulus to the first and second liquids with the first and second electrodes so to vary the radius of curvature of the electrowetting lens and tune the focal length of the electrowetting liquid lens.

2. The method of claim 1 wherein the container body includes multiple supports extending outwardly from the cup and over the flexible base substrate in different directions.

3. The method of claim 1 wherein the curved mounting surface is defined upon an optic device having a curvilinear surface, and the method further includes arranging the lens assembly upon the optic device such that the flexible base substrate curves about multiple axes for conforming to the curvilinear surface of the optic device.

4. The method of claim 3 wherein the optic device is a camera lens.

5. The method of claim 3 further comprising forming the container body and the flexible base substrate so that the flexible base substrate is thinner than the container body.

6. The method of claim 5 further comprising forming both the container body and the flexible base substrate from the soft polymer material.

7. The method of claim 5 wherein the soft polymer material is a polydimethylsiloxane material.

8. The method of claim 1 wherein the container body is formed from a prepolymer mixture that is cured as a curing temperature and the method further includes applying at least one of a conductive film layer, a dielectric layer, and a hydrophobic coating layer to the container body at an application temperature that is lower than the curing temperature.

9. The method of claim 8 wherein the cup of the container body defines a side wall having an inner circumferential surface and the method further includes applying each of the conductive film layer, dielectric layer, and hydrophobic coating layer upon the inner circumferential surface of the side wall of the cup at the application temperature that is lower than the curing temperature.

10. The method of claim 9 wherein the curing temperature is less than about 80 degrees C. and the application temperature is less than about 40 degrees C.

11. A variable-focus lens system, comprising:
an electrowetting liquid lens for providing a variable-focus characteristic to the variable-focus lens system, the electrowetting liquid lens including a first liquid and a second liquid abutting and immiscible with respect to the first liquid so as to define a curved interface between the first and second liquids, the curved interface responsive to a stimulus to vary a radius of curvature of the curved interface for tuning a focal length of the electrowetting liquid lens;
a container body having a generally cylindrical cup defining a chamber therein and housing the electrowetting liquid lens;
a flexible base substrate arranged below and supporting the container body, the flexible base substrate movable between a first position wherein the flexible base substrate defines a substantially planar profile and a second position wherein the flexible base substrate defines a substantially curved profile shape;
a first electrode received in the container body at a location radially spaced from the cylindrical cup, the first electrode being in electrical contact with the first liquid; and
a second electrode arranged in electrical contact with the second liquid; and
wherein the selective application of the stimulus to the first and second liquids with the first and second electrodes varies the radius of curvature of the electrowetting lens and tunes the focal length of the electrowetting liquid lens.

12. The variable-focus lens system of claim 11 wherein the curved interface defines a radius of curvature responsive to an electrical stimulus.

13. The variable-focus lens system of claim 11 further comprising an optic device defining a curved surface and wherein the lens assembly is arranged upon the curved surface of the optic device.

14. The variable-focus lens system of claim 13 wherein the lens assembly is arranged upon the optic device such that the flexible base substrate conforms to the curved surface of the optic device.

15. The variable-focus lens system of claim 14 wherein the optic device is a camera lens.

16. The variable-focus lens system of claim 14 wherein the optic device is a contact lens.

17. The variable-focus lens system of claim 11 wherein the container body includes multiple supports extending over the flexible base substrate and outwardly from the cup in different directions.

18. The variable-focus lens system of claim 17 wherein the cup of the container body includes a side wall defining a generally circular outer perimeter of the cup and wherein the multiple supports extend radially from the outer perimeter of the cup.

19. The variable-focus lens system of claim 17 wherein the cup of the container body includes a cup side wall defining an inner circumferential surface, the first electrode, a dielectric layer, and a hydrophobic coating layer are arranged between the electrowetting liquid lens and the inner circumferential surface of the cup side wall.

20. The variable-focus lens system of claim 19 wherein an upper surface of the flexible base substrate supports the electrowetting liquid lens from below and the hydrophobic coating layer transversely supports the electrowetting liquid lens.

21. The variable-focus lens system of claim 19 wherein the second electrode is arranged upon the flexible base substrate for electrically communicating with the electrowetting liquid lens.

22. The variable-focus lens system of claim 17 wherein the flexible base substrate defines an inner segment arranged below the cup of the container body and multiple flaps extending outwardly from the flexible base substrate inner segment and respectively arranged below the multiple supports of the container body.

23. The variable-focus lens system of claim 11 wherein both of the container body and flexible base substrate are formed from a soft polymer material.

24. The variable-focus lens system of claim 23 wherein the soft polymer material is a polydimethylsiloxane material.

25. A variable-focus lens system, comprising:
an eiectrowetting liquid lens for providing a variable-focus characteristic to the variable-focus lens system, the electrowetting liquid lens including a first liquid and a second liquid abutting and immiscible with respect to the first liquid so as to define a curved interface between the first and second liquids, the curved interface defining a radius of curvature responsive to an electrical stimulus to vary the radius of curvature for tuning a focal length of the electrowetting liquid lens so as to provide a variable-focus characteristic to the variable-focus lens system;
a container body having a cup defining a chamber therein and housing the electrowetting liquid lens and a support connected to and extending away from the cup in a transverse direction;
a flexible base substrate arranged below and supporting the container body, the flexible base substrate movable between a first position wherein the flexible base substrate defines a substantially planar profile and a second position wherein the flexible base substrate defines a substantially curved profile shape;
a first electrode in the container body at a location radially spaced from the cup, the first electrode being in electrical contact with the first liquid; and
a second electrode arranged in electrical contact with the second liquid;
wherein the selective application or the electrical stimulus to the first and second liquids with the first and second electrodes varies the radius of curvature of the electrowetting lens and tunes the focal length of the electrowetting Liquid lens.

26. The variable-focus lens system of claim 25 wherein the container body includes multiple supports extending from the cup in different directions and overlying the flexible base substrate.

27. The variable-focus lens system of claim 26 wherein the flexible base substrate defines an inner segment arranged below the cup of the container body and multiple flaps extending outwardly from the flexible base substrate inner segment and respectively arranged below the multiple supports of the container body.

\* \* \* \* \*